United States Patent [19]

Shimokuni

[11] Patent Number: 5,727,459
[45] Date of Patent: Mar. 17, 1998

[54] METHOD OF AND APPARATUS FOR PRINTING A CASSETTE ACCOMMODATING A RECORDING MEDIUM OR A CASSETTE ACCOMMODATING CASE AND A CASSETTE ACCOMMODATING A RECORDING MEDIUM

[75] Inventor: Kenji Shimokuni, Miyagi, Japan

[73] Assignee: Sony Corporation, Tokyo, Japan

[21] Appl. No.: 741,296

[22] Filed: Oct. 30, 1996

Related U.S. Application Data

[63] Continuation of Ser. No. 332,107, Oct. 31, 1994, abandoned.

[30] Foreign Application Priority Data

Oct. 29, 1993 [JP] Japan .................... 5-272786
Oct. 29, 1993 [JP] Japan .................... 5-272790

[51] Int. Cl.$^6$ ............................ B41F 17/24
[52] U.S. Cl. .................. 101/36; 101/41; 101/158; 101/251
[58] Field of Search ............... 101/40, 43, 54, 101/36, 41, 251, 158

[56] References Cited

U.S. PATENT DOCUMENTS

| | | | |
|---|---|---|---|
| 2,960,026 | 11/1960 | Weidlich . | |
| 4,246,840 | 1/1981 | Yoshino et al. | 101/37 |
| 4,292,104 | 9/1981 | Heimbach et al. | 101/54 |
| 4,774,885 | 10/1988 | Chmielnik | 101/170 |
| 5,121,687 | 6/1992 | Arcotta | 101/43 |
| 5,394,794 | 3/1995 | Arcotta | 101/43 |

FOREIGN PATENT DOCUMENTS

| | | |
|---|---|---|
| 173658 | 10/1983 | Japan . |
| 1284841 | 8/1972 | United Kingdom . |
| 2030929 | 4/1980 | United Kingdom . |
| 2161811 | 1/1986 | United Kingdom . |

OTHER PUBLICATIONS

*Alkyd Resin Composition*, Patent Abstracts of Japan, vol. 13, No. 24, Publication No. JP63227657, published Sep. 21, 1988, (Masayuki et al.).

Primary Examiner—John S. Hilten
Attorney, Agent, or Firm—Jay H. Maioli

[57] ABSTRACT

A printing apparatus for a cassette accommodating a recording medium such as a tape-shaped recording medium or the like or a cassette accommodating case includes a cylindrical member and a cylindrical pad. The cylindrical member is supplied with an ink which contains an inorganic filler having a comparatively large particle size. The ink is added with a titanate coupling agent or an aluminate coupling agent. The cylindrical member has the concave printing plate formed on its peripheral surface and is supported rotatable. The ink on the concave printing plate is transferred to the cylindrical pad. The cylindrical pad is supported rotatably. The cylindrical pad is brought in contact with the concave printing plate and the surface of the conveyed cassette accommodating the recording medium or the conveyed cassette accommodating case. The ink transferred to the cylindrical pad from the concave printing plate is transferred to the surface of the conveyed cassette accommodating the recording medium or the conveyed cassette accommodating case.

2 Claims, 13 Drawing Sheets

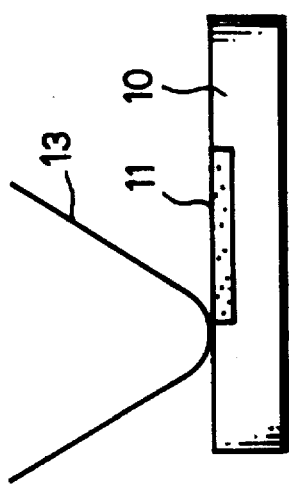
FIGURE.2A
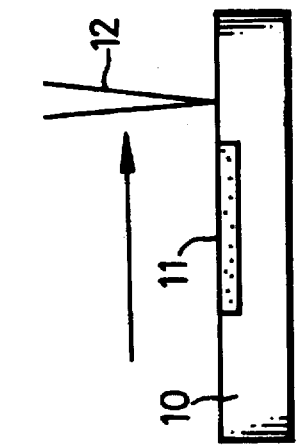
FIGURE.2B
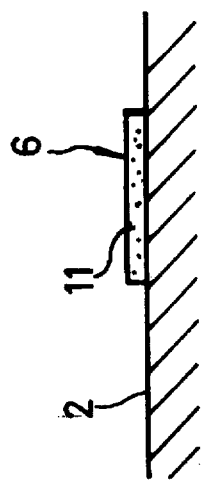
FIGURE.2C
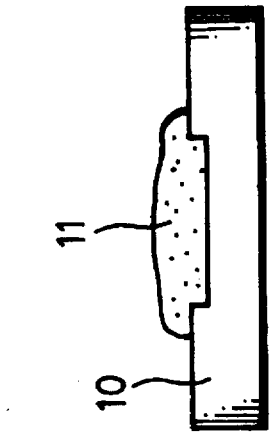
FIGURE.2D
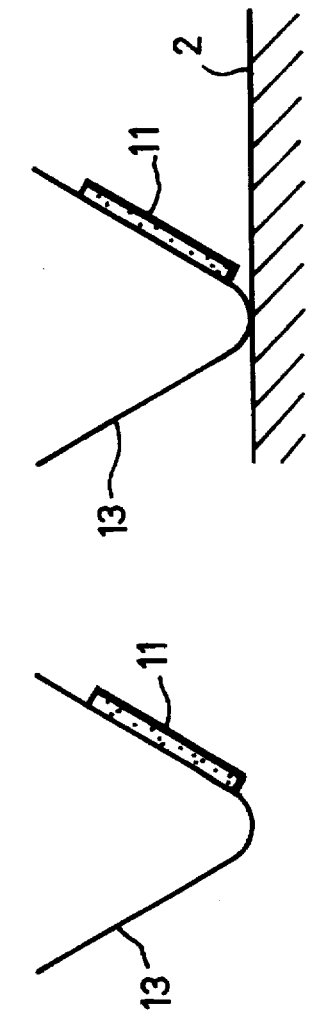
FIGURE.2E
FIGURE.2F

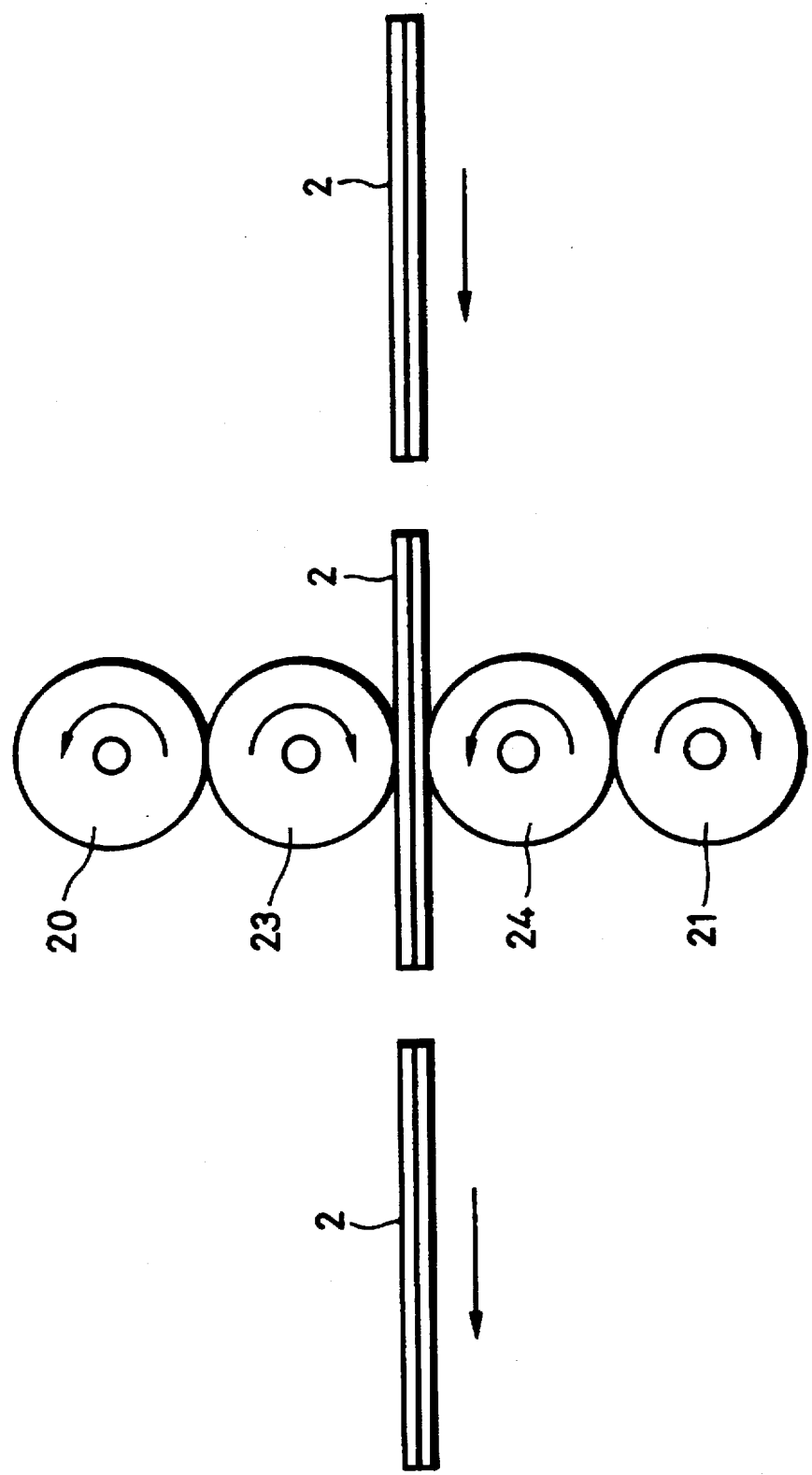

METHOD OF AND APPARATUS FOR PRINTING A CASSETTE ACCOMMODATING A RECORDING MEDIUM OR A CASSETTE ACCOMMODATING CASE AND A CASSETTE ACCOMMODATING A RECORDING MEDIUM

This is a continuation of application Ser. No. 08/332,107 filed Oct. 31, 1994, now abandoned.

BACKGROUND

1. Field of the Invention

The present invention relates to method of and apparatus for printing a cassette accommodating a recording medium or a cassette accommodating case and a cassette accommodating a recording medium and particularly to an intaglio printing method and apparatus of the cassette accommodating the recording medium and the cassette accommodating case and the cassette accommodating the recording medium to be printed.

2. Background of the Invention

Some recording-medium housing cassettes, for example, tape cassettes and housing cases thereof, have on their surfaces write areas (so-called label areas) formed by direct printing with an ink on which letters and the like can be directly written with a writing instrument. A title of the cassette and the like can be directly written with the writing instrument on the label area formed by printing.

FIG. 1 shows an example of the recording-medium housing cassette having the label area, i.e., a tape cassette or a so-called audio compact cassette which is commercially available on the market. A tape cassette 1 includes a plastic cassette housing 2 in which a pair of hubs around which a magnetic tape is wound as the recording medium are rotatably accommodated. Insertion apertures 3a, 3b of hub driving shafts for magnetic tape traveling are formed through a substantially middle portion of the tape cassette 1. The cassette tape 1 has through its trapezoidal portion insertion apertures 4a, 4b of capstans for the magnetic-tape travelling and reference apertures 5a, 5b used for positioning the cassette in a recording and/or reproducing apparatus. These insertion apertures 3a, 3b, insertion apertures 4a, 4b and the reference apertures 5a, 5b are formed so as to pierce the tape cassette 1 in its thickness direction. Though not shown, a plurality of opening portions used for recording and/or reproducing an information signal on and/or from the magnetic tape are formed through a side surface corresponding to the trapezoidal portion of the tape cassette 1.

Reference numeral 6 depicts a print surface which is formed on a surface of the cassette housing by a so-called solid printing with the ink where letters and the like can be directly written. The user can write music selection titles and so on on the print surface 6 with a pen.

A so-called pad printing is typically considered as one of methods of such printing on the tape cassette 1.

A printing method based on the pad printing will be briefly described with reference to FIGS. 2A through 2F.

As shown in FIG. 2A, an ink 11 is coated on a plate, i.e., an intaglio plate 10. Subsequently, as shown in FIG. 2B, extra ink is removed by a blade 12 and only the ink 11 of a necessary amount is left in a concave portion of the plate 10. In this state, as shown in FIG. 2C, a pad 13 is pressed onto the plate 10. The pad 13 is made of silicone rubber and might have any suitable shape, such as a semi-cylindrical shape as shown in FIG. 3, a cone shape as shown in FIG. 4 or a shape of frustum of quadrangular pyramid (its upper surface portion has a circular shape). Each of the pads 13 shown in FIGS. 3 to 5 is shaped so as to have a stepped portion at its tip end center portion.

Such pad 13 is pressed to the plate 10 with strong pressure to transfer the ink 11 on the plate 10 onto the pad 13 side as shown in FIG. 2D. Specifically, the pad 13 receives the ink 11. As shown in FIG. 2E, the pad 13, which received the ink 11 from the plate 10, is pressed onto the surface of the cassette housing 2 which is a printed object. Then, as shown in FIG. 2F, the ink 11 is transferred to the surface of the cassette housing 2, and a portion onto which the ink 11 is transferred becomes the print surface 6.

When a very large area is printed by pad printing, an area of the concave portion of the plate also becomes large. Therefore, in the process in which the extra ink 11 is removed by the blade 12, it is frequently observed that the blade 12 sinks deeply in the concave portion of the plate 10 to remove the ink 11 or more than is necessary. As a result, the ink 11 to be transferred to the pad 13 becomes uneven in thickness, resulting in unevenness in the printing.

To prevent the blade 12 from deeply sinking, there is proposed a method in which the plate 10 is shaped in a halftone pattern as shown in FIG. 7 instead of being shaped so as to be a simple concave. The "halftone pattern" referred to in this specification hereinafter represents a pattern in which the whole printing plate is divided in a lattice fashion and a plurality of very small concave portions corresponding to a printed pattern.

A pattern called "150 lines and 90%" is used as the halftone pattern. The pattern is such a pattern that a reference cell 15 having an area of $1/150$ square inch, i.e., a section made by dividing a surface of one square inch with 150 lines at constant intervals in each of vertical and horizontal directions is regarded as a reference cell and an area of a concave portion 16 (hatched portion) in the cell 15 occupies 90% of all the area of the cell 15. The rest of 10% is occupied by a convex portion 17 (dotted portion).

As shown in FIG. 9, when the pad printing is carried out with the plate having the halftone pattern thus formed, the pad receives the ink from the concave portion 16 of the plate and transfers it to the cassette housing which is a printed object. Then, since the pad is pressed onto the cassette housing, the ink transferred so as to surround a portion where the ink is not transferred is spread to the portion with on ink corresponding to the convex portion 17 to thereby print the cassette housing in a substantially solid fashion.

As described above, when the tape cassette is printed with the pad printing, the following problems arise.

The above-mentioned pad printing uses the pad of suitable shapes, such as the semicylindrical shape shown in FIG. 3, the cone shape shown in FIG. 4, or the shape of the frustum of a quadrangular pyramid shown in FIG. 5. However, when these pads are used, they are prevented from carrying out the printing using a portion around their tops, so that the printing area is limited. Accordingly, when the label area is provided on the cassette housing in the printing employing the ink on which letters and so on can be written, the label area is limited in shape.

Since the pads having the above-mentioned shapes apply nonuniform pressure to the cassette housing when the cassette housing is printed, it is frequently observed that the cassette housing is cracked.

Especially, since the pad printing cannot provide a sufficient thickness of the ink because the pad printing is transfer printing, a color of the cassette housing cannot be covered satisfactorily. Therefore, in order to cover the color of the cassette housing satisfactorily, the printing is sometimes carried out twice or more on the same surface so as to produce two printed layers or more. In this case, if such printing is continued with the plate having the halftone pattern as shown in FIG. 9, the halftone patterns become overlapped and emphasized when the printing is carried out twice or more although the halftone pattern is not so conspicuous when the printing is carried out once. In that case, the halftone pattern appears as a striped pattern.

It is frequently observed that the print surface is printed on a portion displaced from a correct print position when a printing machine and a plate are not correctly set upon printing. This defect becomes remarkably noticeable especially when a large area up to substantially an outer peripheral portion of the cassette housing is printed like the cassette tape shown in FIG. 1.

Since especially the above-mentioned pad printing is not able to increase the thickness of the print layer to be formed and cannot hide the color of the tape cassette sufficiently, it is frequently observed that the same surface is printed twice or more so as to have two print layers or more in order to remove such disadvantages. In this case, however, the printed layers are displaced in position from each other as shown in FIG. 10, so that this displacement in position leads to difference in covering property, i.e., difference in print density. As a result, an end portion of the print surface looks extremely uneven.

When the ink contains an inorganic filler, the inorganic filler is unsatisfactory in compatibility with an organic material (resin and a solvent) which is a base of the ink, and dispersion, being a factor to lower a material intensity of the print surface. In other words, the inorganic filler is inferior in ink adhesion, wear resistance and scratch resistance of the ink.

SUMMARY OF THE INVENTION

It is therefore an object of the present invention to provide a printing apparatus for a cassette accommodating a recording medium or a cassette accommodating case in which the above problems can be solved.

It is another object of the present invention to provide a printing method for a cassette accommodating a recording medium or a cassette accommodating case in which the above problems can be solved.

It is still another object of the present invention to provide an ink used for printing of a cassette accommodating a recording medium or a cassette accommodating case in which the above problems can be solved.

It is yet an object of the present invention to provide a cassette in which the above problems can be solved.

According to the present invention, the apparatus for printing the cassette accommodating the recording medium or the cassette accommodating case includes a cylindrical member and a cylindrical pad. The cylindrical member is supplied with the ink and is provided on its peripheral surface with a concave printing plate. The cylindrical member is rotatably supported. The ink on the concave printing plate is transferred to the cylindrical pad. The cylindrical pad is rotatably supported. The cylindrical pad is brought in contact with the concave printing plate of the cylindrical member and brought in contact with a surface of a conveyed cassette accommodating the recording medium or the cassette accommodating case. The ink, which is supplied to the concave printing plate and then transferred to the cylindrical pad, is transferred to the surface of the conveyed cassette accommodating the recording medium or of the conveyed cassette accommodating case.

According to the present invention, the method of printing the cassette accommodating the recording medium or the cassette accommodating case includes steps of supplying the ink to the concave printing plate formed on the peripheral surface of the rotatably supported cylindrical member, transferring the ink on the concave printing plate to the cylindrical pad which is rotatably supported and in contact with the concave printing plate, and transferring the ink, which is transferred to the cylindrical pad from the concave printing plate, to the surface of the conveyed cassette accommodating the recording medium or of the conveyed cassette accommodating case when the cylindrical pad is brought in contact with the surface of the conveyed cassette accommodating the recording medium or of the conveyed cassette accommodating case.

According to the present invention, the apparatus for printing the cassette accommodating the recording medium or the cassette accommodating case includes at least two members in which the concave printing plates are formed and a plurality of the pads. At least two members in which the concave printing plates are formed and a plurality of the pads are supplied with the ink. The concave printing plates are formed of a plurality of concave portions disposed in a halftone fashion. The ink on the concave printing plates is transferred to a plurality of the pads. Each of the pads is brought in contact with the concave printing plate of the member and with the surface of the conveyed cassette accommodating the recording medium or of the conveyed cassette accommodating case. The two members in which the concave printing plates are formed are disposed so that the halftone patterns thereof should be inclined at predetermined angles. The ink, which is supplied to the concave printing plates and then transferred to the pads, is successively transferred to the surface of the conveyed cassette accommodating the recording medium or of the conveyed cassette accommodating case.

According to the present invention, there is provided the ink used for the printing of the cassette accommodating the recording medium or the cassette accommodating case. The ink is supplied to the concave printing plate. The ink on the concave printing plate is transferred to the pads in contact with the concave printing plate. The pad is brought in contact with the surface of the conveyed cassette accommodating the recording medium or of the conveyed cassette accommodating case and then transfers the ink, which is supplied to the concave printing plate and then transferred to the pad, to the surface of the conveyed cassette accommodating the recording medium or of the conveyed cassette accommodating case. The printing of the cassette accommodating the recording medium or the cassette accommodating case is thus carried out. The ink contains an inorganic filler having a comparatively large particle size and includes a titanate coupling agent or an aluminate coupling agent.

According to the present invention, the cassette accommodating the recording medium to be printed includes a cassette body and a groove portion. The cassette body accommodates the recording medium such that the recording medium can be recorded and reproduced. The groove portion is formed at an end portion of the printed portion of the cassette body and at a boundary portion between the printed portion and a periphery portion.

According to the present invention, since the ink is transferred with the rotatably supported pad in accordance with the pattern of the concave printing plate, the surface of the cassette accommodating the recording medium or of the cassette accommodating case can be widely and uniformly printed.

According to the present invention, at least two members having the concave printing plates formed of a plurality of the concave portions disposed in a halftone pattern are disposed so that the halftone patterns thereof should be inclined at predetermined angles. Therefore, when a plurality of print layers are formed on the surface of the cassette accommodating the recording medium or the cassette accommodating case, the pattern formed by a plurality of concave portions disposed in a halftone pattern is prevented from becoming conspicuous, so that uniform printing can be carried out.

According to the present invention, the ink used for the printing of the conveyed cassette of the recording medium or the conveyed cassette accommodating case contains the inorganic filler having comparatively large particle size and includes the titanate coupling agent or the aluminate coupling agent. When the above ink is used, wettability of the organic material in the ink and the dispersion property of the inorganic filler are improved and viscosity of the ink can be optimized. Therefore, the printing can be carried out satisfactorily.

According to the present invention, the stepped portion is formed at the end of the printed portion of the main body accommodating the recording medium such that the recording medium can be recorded and reproduced and at the boundary portion between the printed portion and the peripheral portion. Therefore, even if the printed portion is displaced in position from the correct printed position upon printing, this positional displacement can be prevented from influencing printed results.

BRIEF DESCRIPTION OF THE DRAWINGS

FIGS. 2A through 2F are diagrams used to explain processes of a pad printing, wherein FIG. 2A shows the state that an ink is being coated on a plate, FIG. 2B shows a process in which unnecessary ink is being removed, FIG. 2C shows a process in which th ink on a plate is transferred to a pad, FIG. 2D shows a process in which the ink is being transferred to the pad, FIG. 2E shows a process in which the ink is being transferred to a printed object, and FIG. 2F shows the ink has transferred to the printed object;

FIG. 12 is a perspective view showing a structure of a main part of a pad printing apparatus according to a second embodiment of the present invention;

FIGS. 13A and 13B are plan views of the pattern of the plate used in the pad printing apparatus according to a third embodiment of the present invention, wherein FIG. 13A is a plan view showing the pattern of the plate used to form a first print layer on the printed object and FIG. 13B is a plan view showing the pattern of the plate used to form a second print layer on the printed object;

DESCRIPTION OF THE PREFERRED EMBODIMENTS

Printing method and apparatus of a cassette accommodating a recording medium or a cassette accommodating case and the cassette accommodating the recording medium according to the present invention will hereinafter be described in detail with reference to the drawings. In the following embodiments, a tape cassette accommodating a magnetic tape will be described as a tape cassette accommodating a recording medium by way of example.

Figure 11:
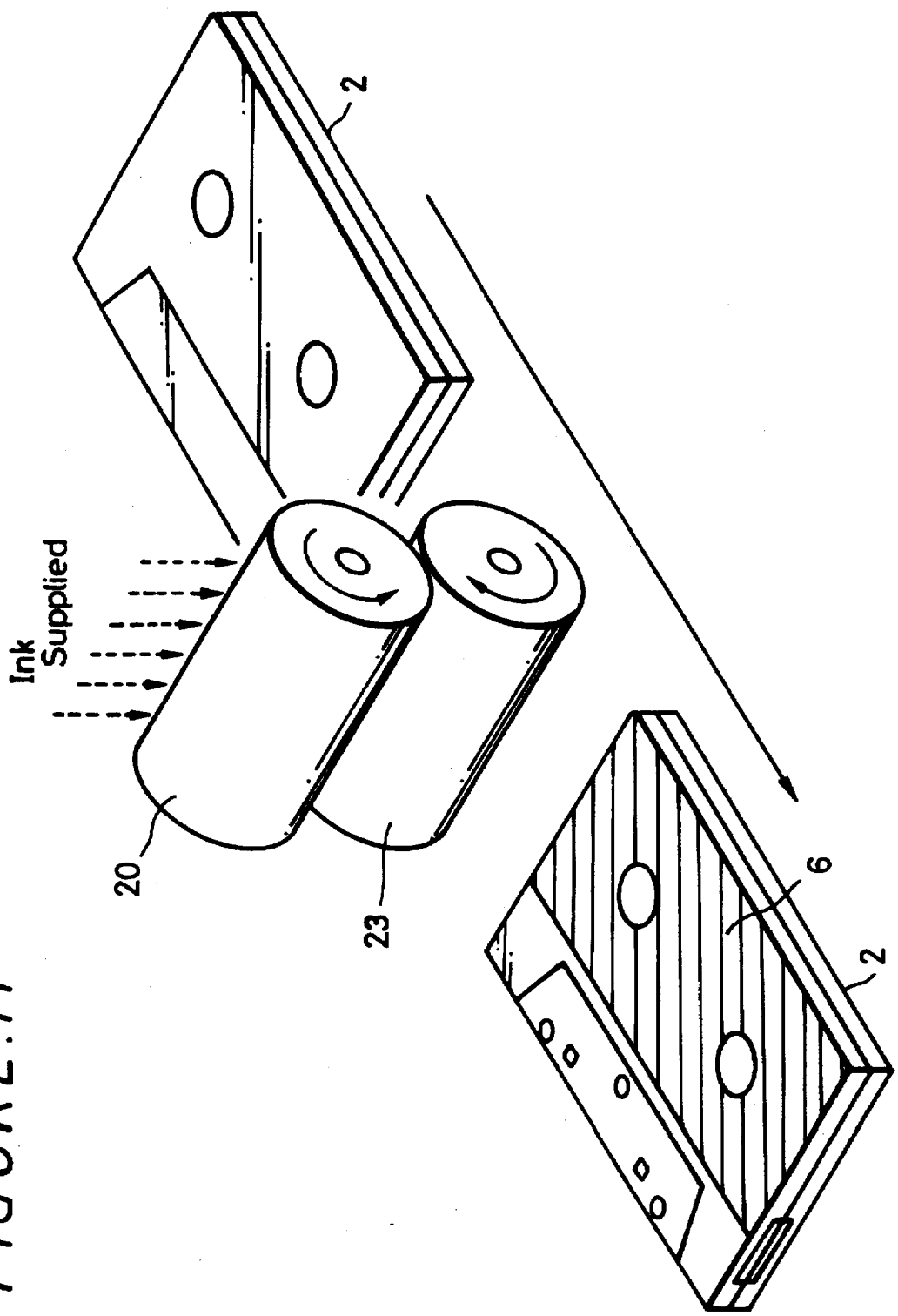
FIG. 11 is a perspective view showing a structure of a main part of a pad printing apparatus according to a first embodiment of the present invention.

Initially, a first embodiment according to the present invention will be described with reference to FIGS. 11 and 12. The first embodiment uses a pad printing machine of a rotary type to print the surface of a printed object, such as a tape cassette or the like. As shown in FIG. 11, the rotary type pad printing machine uses a cylindrical pad 23 which is made of silicone rubber and the like and is rotatably supported about a shaft (not shown). The cylindrical pad 23 is rotated in contact with the surface of a cassette housing 2 as the printed object, thereby the surface of the cassette housing 2 is printed. The tape cassettes as the printed object of the following embodiments are constructed similarly to that shown in FIG. 1. Therefore, reference numerals identical to those used in FIG. 1 will be used.

The printing apparatus uses a plate 20 having a cylindrical shape as a plate. The cylindrical plate 20 has a concave portion as a plate surface formed on its circumferential surface and is rotatably supported about a shaft (not shown). The plate 20 is supplied with an ink similarly to FIGS. 2A and 2B. The plate 20 is supplied with the ink from a tip end portion of a nozzle (not shown). An extra ink on the plate 20 is removed by a blade (not shown) disposed at the downstream side position of the rotational direction of the plate 20. The plate 20 is rotated in unison with the rotation of the pad 23. With rotation, the pad 23 receives the ink from the plate 20. The pad 23 is kept rotating and brought in contact with the surface of the cassette housing 2 with predetermined pressure being applied. In this way, the ink on the pad 23 is transferred to the surface of the cassette housing 2. The pad 23 is rotated by a pad driving mechanism (not shown) in synchronism with a conveying mechanism (not shown) for conveying the cassette housing 2 in the horizontal direction.

Since the rotary type pad printing machine transfers the ink to the surface of the cassette housing 2 while the cylindrical pad 23 is rotating, the uniform solid printing can be carried out widely on the surface of the cassette housing 2.

Therefore, especially when a write area, i.e., a label area is to be formed on the surface of the cassette housing 2 by printing using an ink by which letters and the like can be written with a writing instrument, the write area can be formed on the tape cassette so as to have a wide area, i.e., the user can write much more music selection titles and the like on the label area.

Since the rotary type pad printing machine prints the cassette housing 2 as the printed object with applying uniform pressure, the cassette housing 2 can be substantially prevented from being damaged by the pressure. Thus, the printed object can be protected from being cracked as compared with the printing method shown in FIGS. 2A through 2F.

The rotary type pad printing machine completes one printing cycle more rapidly and exhibits increased productivity as compared with the printing method or apparatus shown in FIGS. 2A to 2F.

A pad printing apparatus according to a second embodiment of the present invention will be described with reference to FIG. 12. Like elements and parts corresponding to those of the first embodiments are marked with the same reference numerals and therefore need not be described in detail. The first embodiment uses the plate 20 and the pad 23 which are disposed on one surface side of the cassette housing 2. Therefore, only one surface of the cassette housing 2 can be printed in one printing process. The pad printing apparatus shown in FIG. 12 uses a pair of a cylindrical plate 21 and a cylindrical pad 24 in which concave printing plates having patterns are formed. The cylindrical plate 21 and the cylindrical pad 24 are disposed on the opposite side of the plate 20 and the pad 23 across a path through which the cassette housing 2 is conveyed. The plate 21 is supplied with the ink and rotatably supported about a shaft (not shown). When the pad 24 is brought in contact with the plate 21, the ink on the plate 21 is transferred to the pad 24. The pad 24 is rotatably supported about a shaft (not shown).

In the printing apparatus thus arranged, the cassette housing 2 is conveyed by a conveying apparatus (not shown) between the pads 23 and 24 in a horizontal direction. When the cassette housing 2 is conveyed between the pads 23 and 24, the ink transferred to the pads 23 and 24 is transferred to the front and rear surfaces of the cassette housing 2, respectively. The pads 23 and 24 are brought in contact with the passing cassette housing 2 with predetermined pressure being applied to the cassette housing 2. As a consequence, both of the surfaces of the cassette housing 2 are printed simultaneously.

According to the second embodiment, it is possible to print the upper and lower surfaces of the cassette housing 2 simultaneously by symmetrically disposing the cylindrical pads 23, 24 and the cylindrical plates 20, 21 with respect to upper and lower shells of the cassette housing 2. Thus, printing efficiency can be improved and productivity is further enhanced. The present invention is not limited to the arrangement in which one pair of the plate 20 and the pad 23 and the other pair of the plate 21 and the pad 24 are disposed in alignment, but either of the pairs may be disposed at the offset position in the upstream and downstream sides of the conveying direction of the cassette housing 2.

Figure 9:
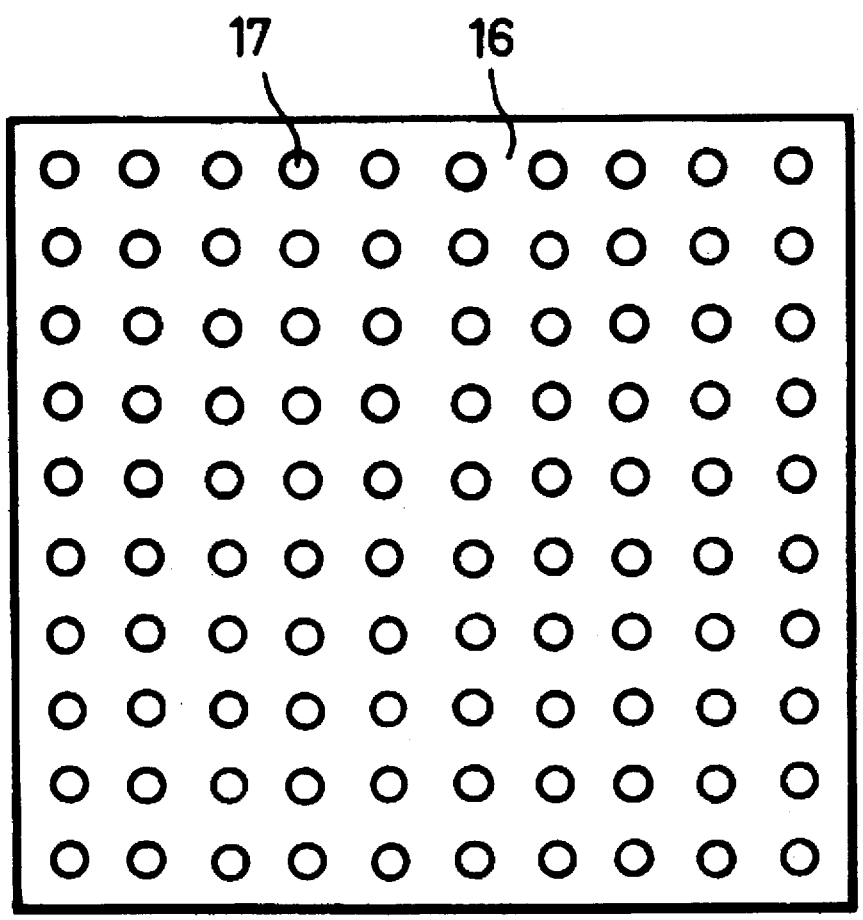
FIG. 9 is an explanatory diagram showing a pattern of another example of the plate used in the pad printing.
Figure 10:
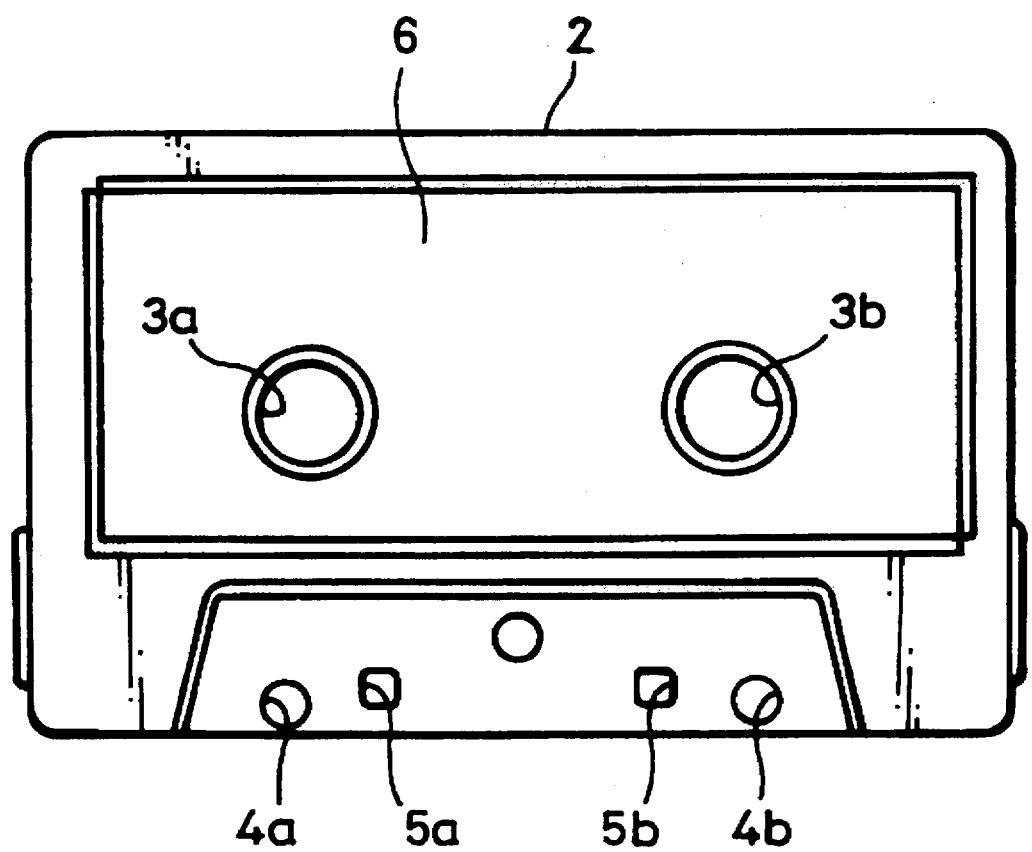
FIG. 10 is a plan view of a tape cassette and illustrating the state that the printed surface of the tape cassette is displaced from the correct position.
Figure 13A:
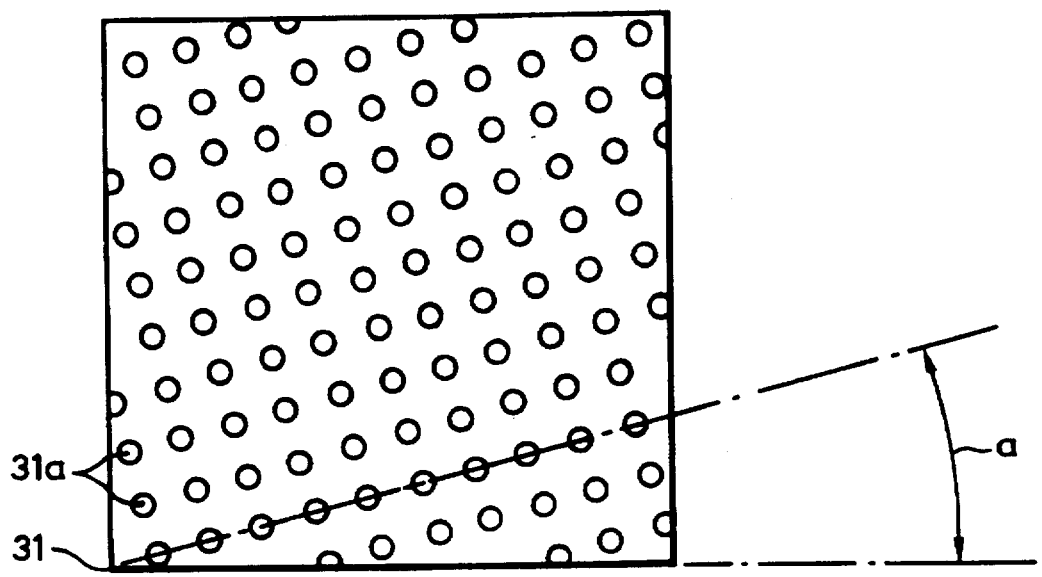
Figure 13B:
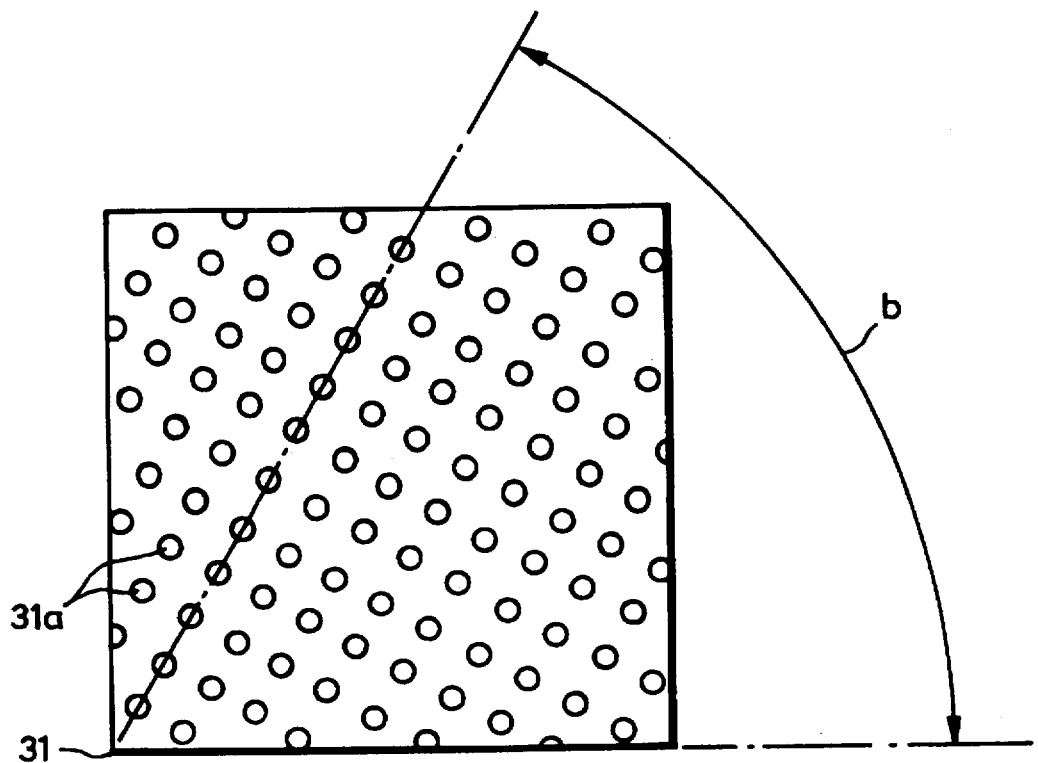

A third embodiment of the present invention will be described with reference to FIGS. 13A and 13B. According to the third embodiment, the plate is not formed of the concave portion shown in FIG. 9 but it is formed of an assembly of a plurality of very small concave portions. A printing method of multilayer printing with the above plates will be described. The third embodiment shows a bilayer printing method. The third embodiment uses a first plate 30 having a halftone pattern shown in FIG. 13A and a second plate 31 having a halftone pattern shown in FIG. 13B. The first plate 30 forms a first print layer to be formed on the cassette housing 2, and the second plate 31 forms a second print layer to be formed on the cassette housing 2. The halftone patterns of the first and second plates 30 and 31 are formed so that an inclination angle a of the halftone pattern of the first plate 30 and an inclination angle b of the halftone pattern of the second plate 31 should satisfy a≠b. The halftone patterns of the third embodiment shown in FIGS. 13A and 13B are formed with the inclination angles as a=15° and b=60°, respectively.

When the cassette housing 2 as the printed object is printed by using the first and second plates 30 and 31 thus formed, the ink is coated on the first plate 30 and then the extra ink thereon is removed by a blade (not shown). Similarly, the ink is coated on the second plate 31 and the extra ink is removed by a blade (not shown). In this state, the ink on the first plate 30 is transferred to a first pad (not shown) and the ink on the second plate 31 is transferred to a second pad (not shown). Then, the first pad is brought in contact with the conveyed cassette housing 2 with predetermined pressure and the ink on the first pad is transferred to the surface of the cassette housing 2 as the first print layer. Subsequently, the cassette housing 2 is conveyed and brought in contact with the second pad. The second pad is also brought in contact with the cassette housing 2 with predetermined pressure similarly to the first pad. As a result, the ink on the second pad is transferred to the first print layer of the cassette housing 2 as the second print layer. In this case, since the inclination angles of the halftone patterns of the first and second pads 30 and 31, i.e., of an arrangement pattern of a plurality of dotted portions 30a of the first plate 30 and an arrangement pattern of a plurality of dotted portions 31a of the second plate 31 are different from each other as described above, the arrangement patterns of the dotted portions 30a and 31a of the plates 30 and 31 are prevented from overlapping. Therefore, a pattern of unevenness in the printing on the cassette housing 2 and unevenness in thickness of the print layer thereof can be prevented from being produced on the print surface printed on the cassette housing 2.

When the overlapping-printing of two print layers or more is carried out by the plate having the halftone pattern, i.e., plate having a plurality of dotted portions, if the inclination angles of the dotted portions of the plate are changed at every layer, then it is possible to prevent the arrangement patterns of the dotted portions from overlapping completely even though several print layers are overlapped. Accordingly, influence of the arrangement patterns of the dotted portions are prevented from being emphasized. Conversely, the print layers are printed so that each of the dotted patterns should cover a blank portion of the other. Therefore, any pattern caused by the arrangement pattern of the dotted portions becomes inconspicuous after printing so that the uniform and satisfactory solid printing can be carried out. Such uniform and satisfactory solid printing achieves a significant effect particularly when a pattern with a wide print surface is printed.

While the multilayer-printing with the two print layers is described so far in the third embodiment, the present invention is not limited thereto and can be applied to the multilayer-printing with three layers or greater. When the three layers or greater are printed, the inclination angles of the arrangement patterns of the dotted portions of the plates are set such that the arrangement patterns of the dotted portions should not overlap. As a result, as described above, it is possible to achieve the same effects as those achieved by the above-mentioned printing of the two print layers.

The plates shown in the third embodiment can be used by the rotary type pad printing machine shown in the first embodiment and by an intaglio printing machine using a plane plate.

Figure 1:
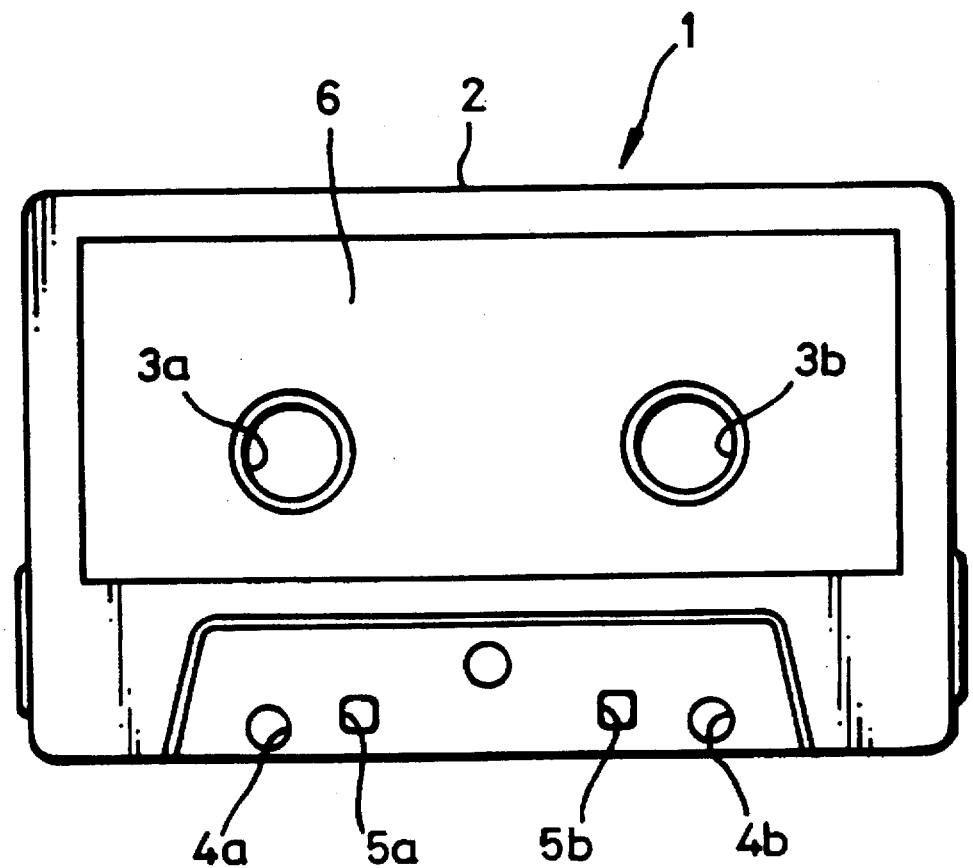
FIG. 1 is a plan view of a printed tape cassette.
Figure 3:
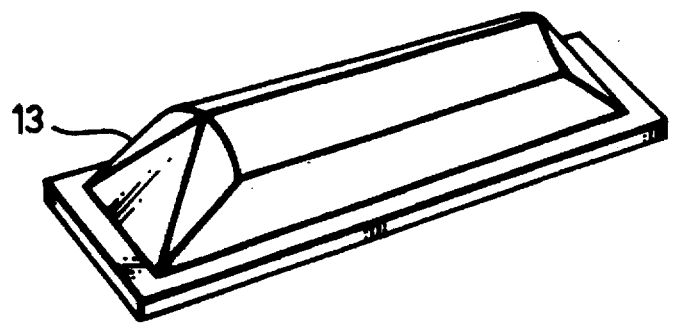
FIG. 3 is a perspective view showing an example of a shape of the pad.
Figure 4:
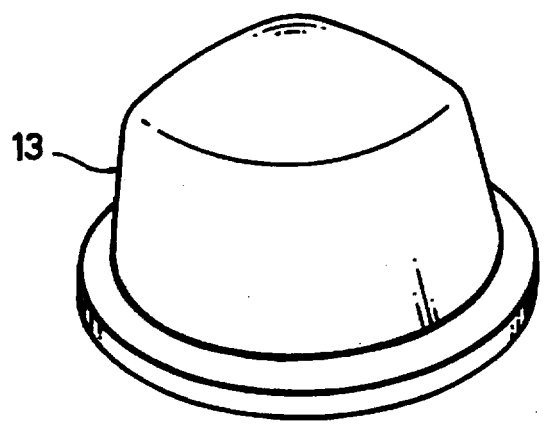
FIG. 4 is a perspective view showing another example of the shape of the pad.
Figure 5:
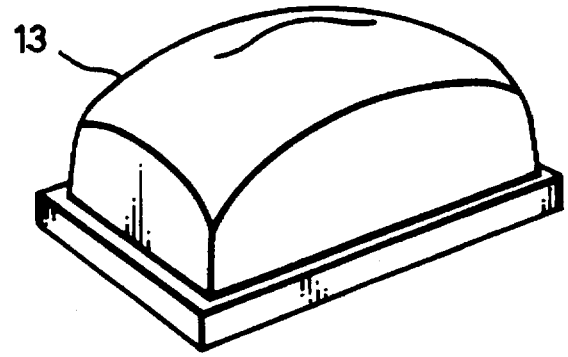
FIG. 5 is a perspective view showing still another example of the shape of the pad.
Figure 6:
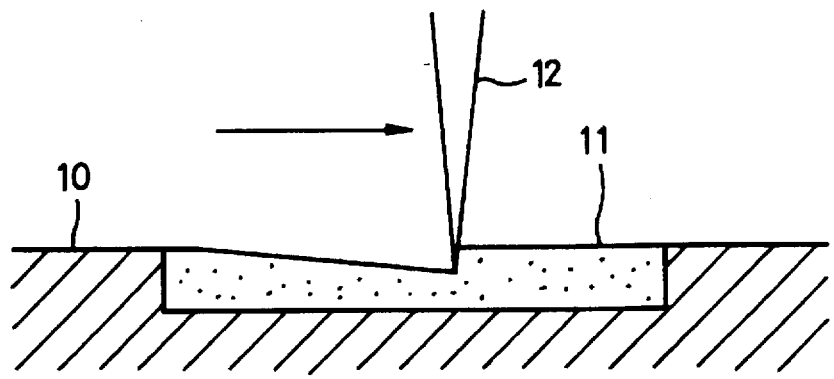
FIG. 6 is a diagram showing the state that a blade is sinking into a concave portion of the plate.
Figure 7:
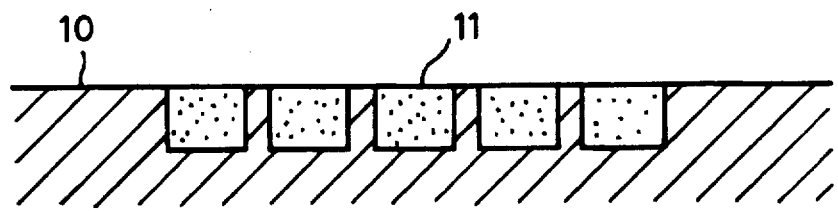
FIG. 7 is a cross-sectional view showing a structure of another example of the plate used in the pad printing.
Figure 8:
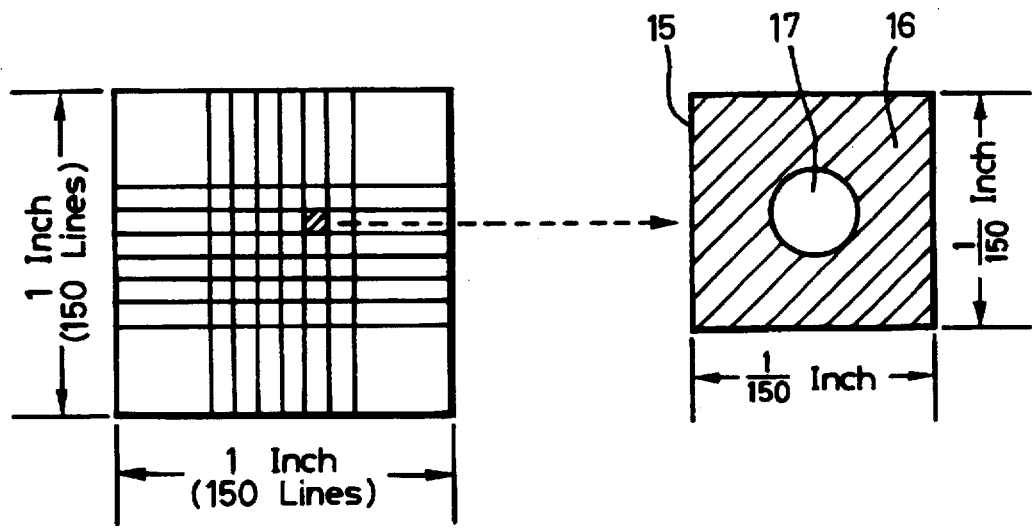
FIG. 8 is a plan view showing a structure of another example of the plate used in the pad printing and illustrating a part of the plate in an enlarged scale.

Ink used in the printing of the above-mentioned embodiments and construction of the tape cassette used therein will be described. Like elements and parts corresponding to those of the tape cassette shown in FIG. 1 are marked with the same reference numerals and therefore need not be described in detail.

Figure 14:
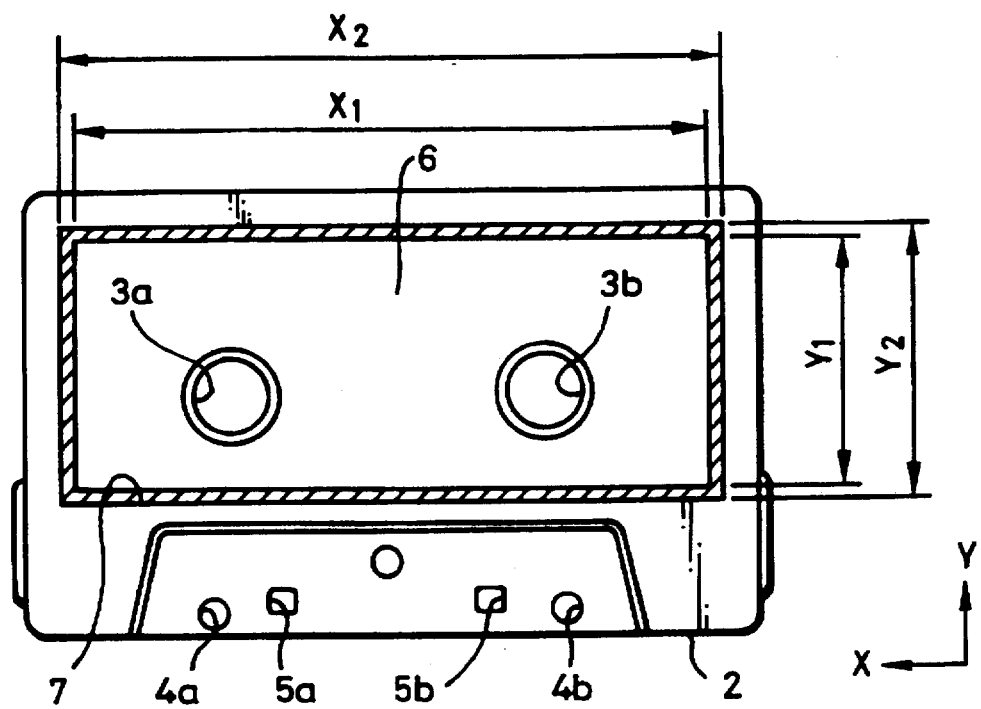
FIG. 14 is a plan view showing a structure of a tape cassette according to the present invention.
Figure 15:
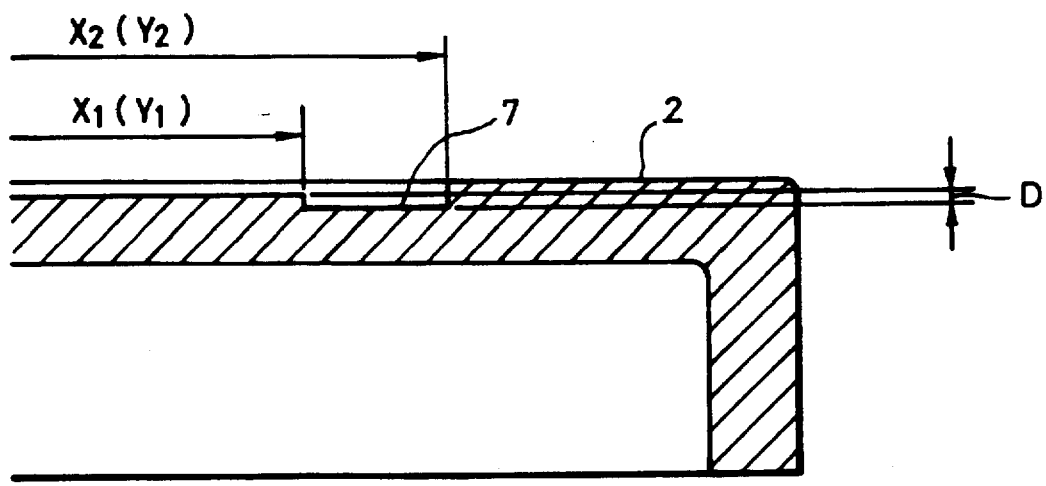
FIG. 15 is an enlarged, cross-sectional view showing a main part of the tape cassette shown in FIG. 14.

As shown in FIG. 14, the cassette housing 2 of the tape cassette 1 has a groove 7 formed at its portion corresponding to an end portion of the print surface 6. As shown in FIG. 14, the groove 7 is continuously formed along four sides of the print surface 6. Reference symbols $X_1$, $X_2$, $Y_1$ and $Y_2$ depict a length between inside edges of the groove 7 in the lateral direction of the cassette housing 2, a length between outside edges thereof in the lateral direction, a length between the inside edges thereof in the longitudinal direction of the cassette housing 2, and a length between the outside edges thereof in the longitudinal direction thereof. As shown in FIG. 15, the groove 7 is formed in the thickness direction of the cassette housing 2 so as to have a depth D from the surface of the cassette housing 2.

Figure 16:
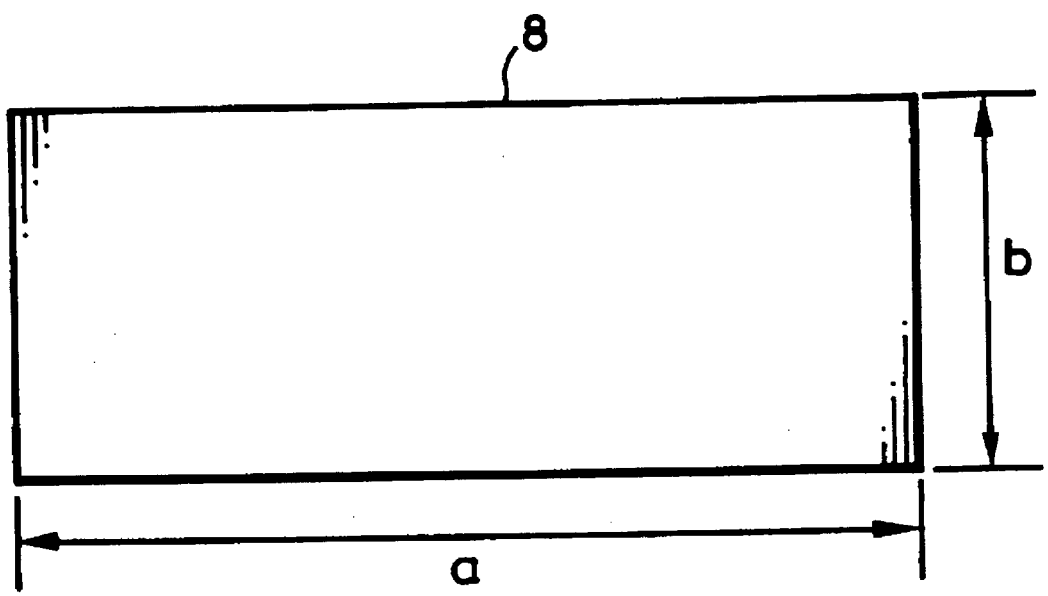
FIG. 16 is a diagram used to explain a frame portion of the plate that is used to print the tape cassette shown in FIG. 14.

On the other hand, as shown in FIG. 16, a lateral direction length a and a longitudinal direction length b of a printing area 8 of the plate used in the printing are set as follows:

$X_1 < a < X_2$ $Y_1 < b < Y_2$

In this case, the length a and b are preferable set as follows:

$a = (X_1 + X_2)/2$ $b = (Y_1 + Y_2)/2$

When the surface of the cassette housing 2 is printed by using the plate formed of the above size, the print surface 6 is formed only in the inside of a portion surrounded by the groove 7 of the surface of the cassette housing 2. In other words, the print surface 6 is formed only by printing a limited rectangular area of the surface of the cassette housing 2 which is restricted in length in the longitudinal direction by the length $X_1$ and also restricted in length in the lateral direction by the length $Y_1$. Thus, when the multilayer overlapping printing is carried out, the end portion of the plate is opposed to the groove 7 formed on the cassette housing 2 so that, even if the plate is displaced from the correct position on the cassette housing 2, the end portion of the print surface 6 formed on the cassette housing 2 is prevented from being shifted from its correct position on the cassette housing 2 due to such positional displacement.

Figure 17:
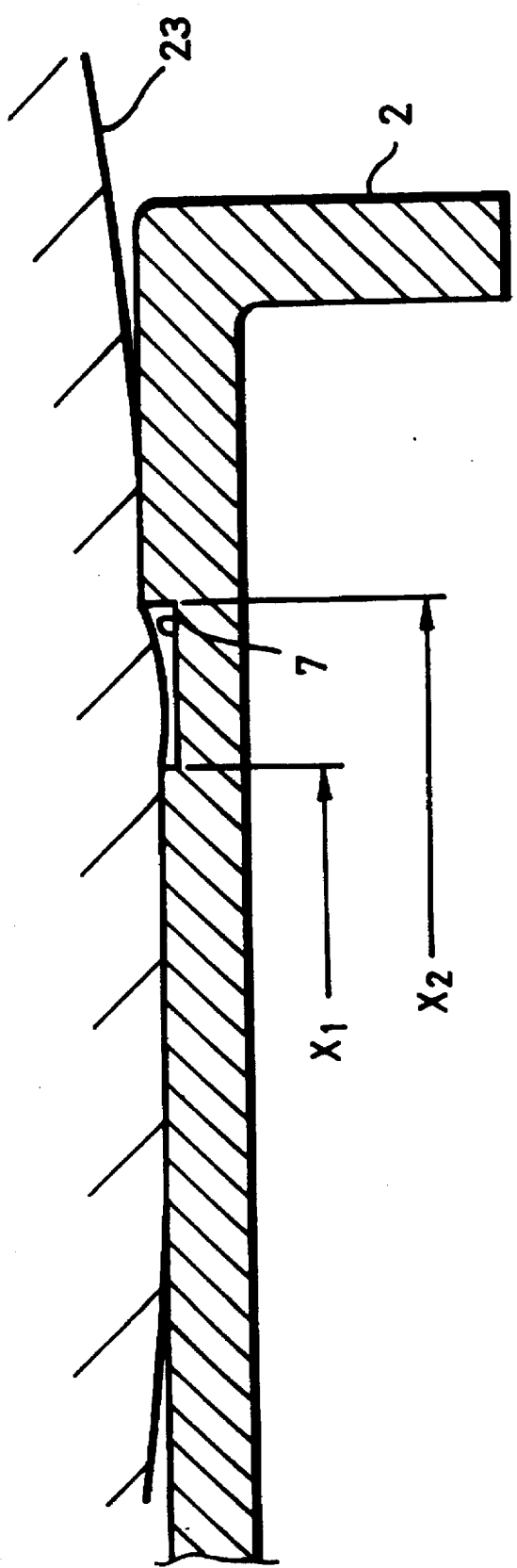
FIG. 17 is a fragmentary enlarged, cross-sectional view showing the state that the tape cassette is being printed by pad printing.
Figure 18:
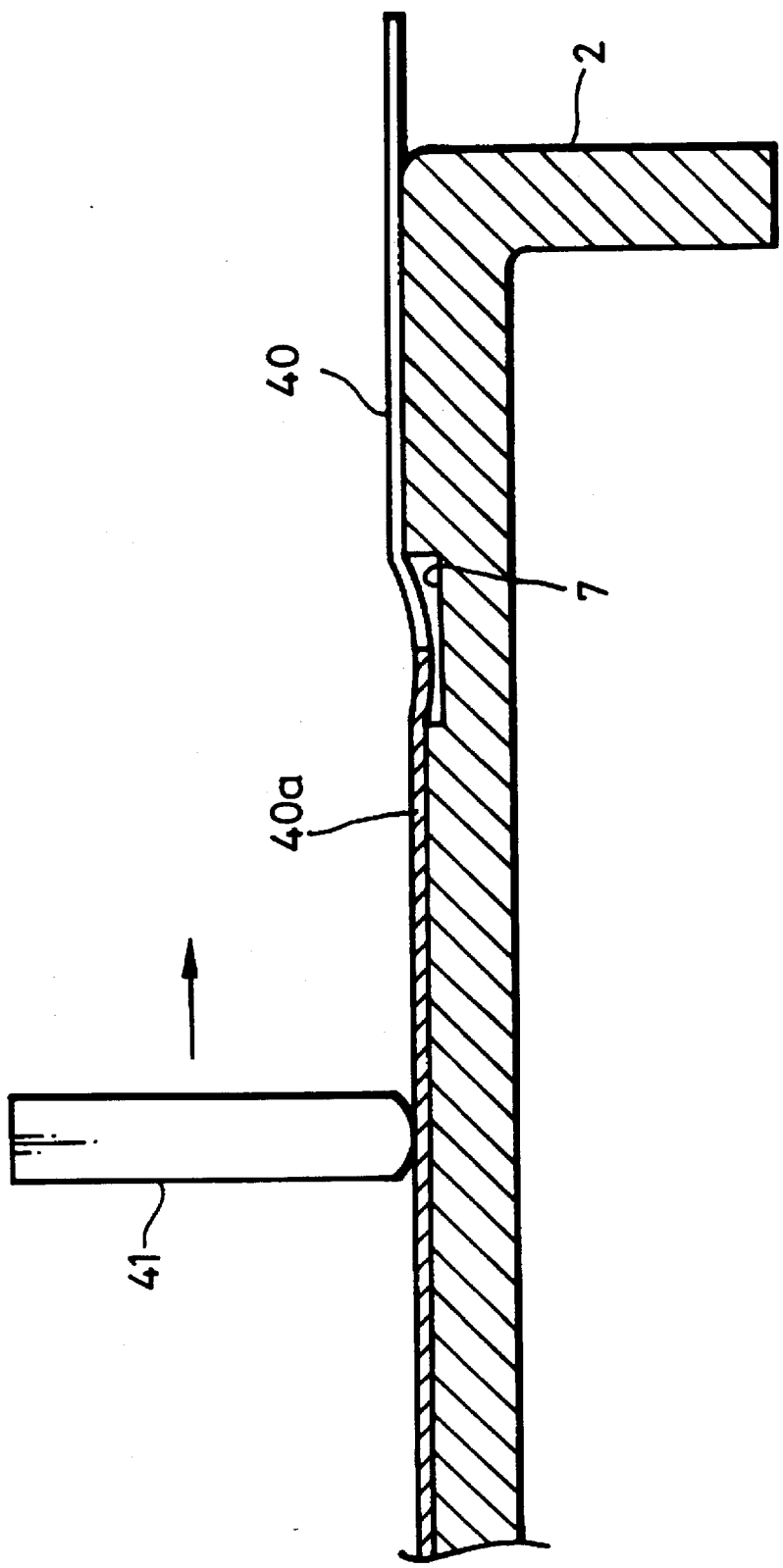
FIG. 18 is a fragmentary enlarged, cross-sectional view showing the state that the tape cassette is being printed by screen printing.

FIGS. 17 and 18 show a printing process in which the tape cassette arranged as described above is printed.

FIG. 17 shows a printing process of the pad printing machine shown in the first embodiment. In FIG. 17, elements and parts identical to those shown in the first embodiment are marked with the same reference numerals and described in detail with reference to the first embodiment. The portions will not be explained in detail.

The ink coated on the plate 20 is transferred from the plate 20 to the pad 23. In this state, the pad 23 is brought in contact with the cassette housing 2 of the tape cassette 1 conveyed by the conveying apparatus. The ink is transferred to the pad 23 up to its portion corresponding to the groove 7 of the cassette housing 2. The ink on the pad 23 is transferred to the surface of the cassette housing 2 by relatively moving the pad 23 and the cassette housing 2. In the initial state that the pad 23 and the cassette housing 2 start being brought in contact with each other, the ink on the pad 23 is not transferred to the surface of the cassette housing 2 because the pad 23 is opposed to the groove 7 of the cassette housing 2. The pad 23 and the cassette housing 2 are relatively moved, whereby the ink on the pad 23 is transferred to the area surrounded by the groove 7 of the cassette housing 2. When the pad 23 and the cassette housing 2 nearly finishes contacting each other, as shown in FIG. 17, the ink on the pad 23 is transferred up to the area indicated by reference symbol $X_1$ in FIG. 17 but is not transferred to the groove 7. The reason for this is that the pad 23 does not reach a bottom portion of the groove 7.

FIG. 18 shows a process of screen printing. In FIG. 18, a printing area 40a is formed on a screen-shaped plate 40 in a mesh fashion. The screen-shaped plate 40 is brought in contact with one surface of the cassette housing 2. At this time, an end portion of the printing area 40a is positioned at the position corresponding to the groove 7 of the cassette housing 2. In this state, a squeegee 41 is moved on the screen-shaped plate 40. The squeegee 41 permits the ink previously coated on the screen-shaped plate 40 to pass through the mesh-shaped portion of the printing area 40a and to then be transferred to the surface of the cassette housing 2. Since the plate 40 is prevented from coming in contact with the bottom portion of the groove 7 when the squeegee 41 is moved on the screen-shaped plate 40 in the direction shown by an arrow in FIG. 18, the groove 7 is prevented from being printed. As a result, only the area surrounded by the groove 7 of the cassette housing 2 is printed by the screen printing similarly to the pad printing.

As described above, when the print surface 6 is shifted from the correct position by causes, such as unsatisfactory accuracy of the printing machine and positional displacement of the plate, the groove 7 formed on the cassette housing 2 absorbs such positional displacement.

In other words, even if the plate and the cassette housing 2 are offset a little in the lateral direction (direction X) and the longitudinal direction (direction Y) when printing, the print surface 6 is constantly printed inside the area having length $X_1$ in the lateral direction and length $Y_1$ in the longitudinal direction along the inside edge of the groove 7. Accordingly, displacement in printing does not occur. Further, the end edge of the print surface 6 is clearly cut at the inside edge of the groove 7 so that sharp printing can be carried out.

The pad printing sometimes employs the overlapping printing with two layers or more in order to satisfactorily hide the color of the cassette housing 2. Especially in this case, the positional displacement of the respective print layers can be absorbed and the groove 7 can achieve considerably significant effects.

The depth D of the groove 7 formed on the surface of the cassette housing 2 has to be set to 0.1 mm at minimum in order to clearly cut the print surface, depending upon hardness of the pad 23 when the pad printing shown in FIG. 17 is carried out and thickness and tension of the screen-shaped plate 40 when the screen printing shown in FIG. 18 is carried out.

While the lateral-direction length a and the longitudinal-direction length b of the printing area 8 of the plate should preferably be set to a=$(X_1+X_2)/2$ and b=$(Y_1+Y_2)/2$, the lateral-direction length a and the longitudinal-direction length b are not limited thereto and may be changed freely because these lengths a and b are effected by the difference in step in the cassette case surface 2.

A width of the groove 7, i.e., lengths $X_1$, $X_2$, $Y_1$ and $Y_2$ should be properly set in accordance with printing accuracy of the printing machine to be used. Further, while this embodiment uses the groove 7 formed along all four sides in the directions X and Y, the present invention is not limited thereto and the groove 7 may be formed on only two sides in direction X or Y in response to performance of the printing machine.

The ink to be used in the printing of the above-mentioned tape cassette will be described.

The ink is a so-called writable ink. Specifically, after this ink is printed on the surface of the cassette housing 2, the user can write the music titles and so on freely on the formed print surface 6 with the pen.

The printing ink used in the present invention is a general screen-printing ink or a general pad-printing ink, in which a base is made by using a polymer, such as vinyl chloride resin, rubber resin, polyester resin, cellulose resin or the like as a binder, by using a solvent, such as aromatic hydrocarbon solvent, ketone solvent, alcohol solvent, ether solvent, ester solvent or the like as a main solvent or a diluent, and by further adding proper pigments and assistants to the above binder and main solvent or diluent and in which further an inorganic filler having comparatively large particle size, such as calcium carbonate, barium sulfate, mica, silica, glass, magnesium oxide, alumina or the like, for example, is added to the base. While calcium carbonate has a particle size of about 3μm, calcium carbonate having a particle size ranging of from about 3 to 10μm is used as the filler added to the base. If the particle size thereof is larger than the above range, then the print surface becomes too coarse. If the particle size thereof becomes smaller than the above range, then the printed surface becomes difficult to scratch with a tip end of a writing instrument and the tip end slips. Thus, the printed surface becomes hard to write on.

Since the inorganic filler having comparatively large particle size is contained in the ink as described above, the surface of the printed ink has proper gaps. As a result, when the user writes something on the surface of the printed ink with the pen, the ink of the pen permeates into these gaps. Thus, the print surface acquires excellent writing properties and dryness. Since the inorganic filler having the large particle size increases coarseness of the print surface, the pen scratches the print surface satisfactorily and the user can write with proper resistance. Therefore, it is possible to enhance writing properties.

According to the present invention, such ink is further added with a titanate coupling agent or an aluminate coupling agent. Alternatively, the inorganic filler may be previously processed for coupling with titanate coupling agent before being added to the base ink. A proper adding amount of the coupling agent relative to the inorganic filler ranges from 0.1 weight percent to ten and several weight percent. For example, the titanate coupling agents manufactured by Ajinomoto Co., Inc. under the trade names of "KR TTS" and "KR 138S" can be used as one used in the present invention.

The aluminate coupling agent manufactured by Ajinomoto Co., Inc. under the trade name of "PLENACT AL-M" can be used as one used in the present invention.

As describe above, since the titanate coupling agent or the aluminate coupling agent is added to the ink containing the inorganic filler in order for the user to write on the print surface with the writing instrument, the inorganic filler is changed in polarity of its surface and in surface energy. Therefore, it is possible to improve its wettability with an organic material (resin) in the ink. Accordingly, dispersion property of the inorganic filler can be improved and viscosity of the ink can be optimized, with the result that the ink has improved printing properties.

Since the titanate coupling agent or the aluminate coupling agent is added into the ink containing the inorganic filler, the coupling between the organic material and the inorganic material in the ink is strengthened. Therefore, it is possible to improve physical strength of the print surface, such as adhesion, wear resistence, and scratch resistance of the ink. Furthermore, it is possible to substantially prevent the layers from being detached when the overlapping-printing with more than two layers is carried out.

The present invention is not limited to the tape cassette (the audio compact cassette) shown in the drawings and can be applied to the printing on various kinds of recording-medium housing cassettes, such as a video tape cassette, a disk cassette or the like and plastic cases for accommodating these cassettes.

Having described preferred embodiments with reference to the accompanying drawings, it is to be understood that the present invention is not limited to those precise embodiments and that various changes and modifications can be effected therein by one skilled in the art without departing from the spirit or scope of the present invention as defined in the appended claims.

What is claimed is:

1. A printing method for printing on a plastic cassette accommodating a recording medium or on a cassette accommodating case, said method comprising steps of:

supplying ink to a first printing surface comprised of a first plurality of concave portions formed on a peripheral surface of a first rotatable cylindrical plate, wherein said first plurality of concave portions is arranged in a first halftone pattern oriented at first predetermined halftone angle ranging from 10° to 60° relative to an edge of said first cylindrical plate;

transferring said ink from said first printing surface to a first rotatable cylindrical pad brought in contact with said first rotatable cylindrical plate;

transferring said ink from said first rotatable cylindrical pad to a surface of one of said cassette accommodating a recording medium and said cassette accommodating case when said first rotatable cylindrical pad is brought in contact with a uniform pressure against said surface of said one of said cassette accommodating a recording medium and said cassette accommodating case being conveyed past said first rotatable cylindrical pad;

supplying ink to a second printing surface comprised of a second plurality of concave portions formed on a peripheral surface of a second rotatable cylindrical plate, wherein said second plurality of concave portions is arranged in a second halftone pattern oriented at a second predetermined halftone angle ranging from 10° to 60° relative to an edge of said second cylindrical plate, said second predetermined halftone angle being different from said first predetermined halftone angle;

transferring said ink from said second printing surface to a second rotatable cylindrical pad brought in contact with said second rotatable cylindrical plate; and transferring said ink from said second rotatable cylindrical pad to said surface of said one of said cassette accommodating a recording medium and said cassette accommodating case when said second rotatable cylindrical pad is brought in contact with a uniform pressure against said surface of said one of said cassette accommodating a recording medium and said cassette accommodating case being conveyed past said second rotatable cylindrical pad.

2. A printing apparatus for a plastic cassette accommodating a recording medium or for a cassette accommodating case, said apparatus comprising:

at least two plates in which respective concave printing surfaces are formed for receiving ink, each of said concave printing surfaces having a plurality of concave portions disposed in a halftone fashion to produce a halftone printing pattern, wherein said halftone printing pattern of each of said plates is respectively oriented at a different predetermined halftone angle within a range of about 10° to 60° relative to a respective edge of said plates; and a plurality of pads to which said ink on said concave printing surfaces is transferred, each of said pads being sequentially brought in contact with a respective plate and then in contact with a common area of a surface of one of said cassette accommodating a recording medium and said cassette accommodating case, whereby ink is sequentially transferred from said concave printing surfaces to said pads and then to said common area of said surface of said one of said cassette accommodating a recording medium and said cassette accommodating case in a respective overlapping fashion.

* * * * *